US006153858A

United States Patent [19]

Barnes et al.

[11] Patent Number: 6,153,858

[45] Date of Patent: Nov. 28, 2000

[54] AUTOMATIC LIGHTING CONTROL SYSTEM FOR A COOKING CAVITY

[75] Inventors: Shelton T. Barnes, Chattanooga; Perry A. Bennett, Cleveland; Kenneth E. Sauter, Ooltewah, all of Tenn.

[73] Assignee: Maytag Corporation, Newton, Iowa

[21] Appl. No.: 09/339,039

[22] Filed: Jun. 23, 1999

[51] Int. Cl.[7] ................................ F24C 7/00; A21B 3/10; H05B 1/02

[52] U.S. Cl. .......................... 219/413; 219/506; 219/489; 219/492

[58] Field of Search ..................................... 219/412, 414, 219/489, 490, 492, 506, 502; 126/19 R, 192, 190, 197, 208; 432/250; 340/588

[56] References Cited

U.S. PATENT DOCUMENTS

| | | | |
|---|---|---|---|
| 4,317,025 | 2/1982 | Starnes | 219/386 |
| 4,874,929 | 10/1989 | Houser | 219/506 |
| 4,990,750 | 2/1991 | Martel et al. . | |
| 5,097,112 | 3/1992 | Kanaya et al. | 219/506 |
| 5,808,278 | 9/1998 | Moon et al. | 219/506 |

FOREIGN PATENT DOCUMENTS

| | | |
|---|---|---|
| 58-195714 | 11/1983 | Japan . |
| 3-67928 | 3/1991 | Japan . |
| 11-159765 | 6/1999 | Japan . |

OTHER PUBLICATIONS

Abstract of JP11–264547, Sep. 28, 1999.

*Primary Examiner*—Joseph Pelham
*Attorney, Agent, or Firm*—Everett G. Diederiks, Jr.

[57] ABSTRACT

A cooking appliance includes an oven cavity having an associated access door provided with a cavity viewing window, a control panel for setting both a desired cooking function and a heat source operating time period, and a light for illuminating the oven cavity of the appliance. The light is controlled so as to be automatically activated prior to the expiration of the set time period for the selected cooking operation in order to bring the attention of the user to viewing the progress of the cooking operation without unnecessarily opening the oven cavity door. If, after viewing the food being cooked, it is determined that further cooking time is warranted, then the process of adding additional cooking time will function to re-set the automatic light activating feature of the invention. In addition, if the user opens the door following activation of the cavity light but prior to the expiration of the established cooking time period, then the light will preferably remain on until after the cooking function is completed. Various provisions are also made for de-activating the light after the cooking operation is completed. Furthermore, if the light is manually activated, the light will automatically be de-activated upon opening and closing of the door.

23 Claims, 2 Drawing Sheets

AUTOMATIC LIGHTING CONTROL SYSTEM FOR A COOKING CAVITY

BACKGROUND OF THE INVENTION

1. Field of the Invention

The present invention pertains to the art of cooking appliances and, more particularly, to a system for automatically controlling the illumination of a viewable cooking cavity of an appliance.

2. Discussion of the Prior Art

When cooking food in an oven cavity, such as in a typical electric range, it is sometimes desirable to view the food during intervals of the cooking operation. However, prematurely opening the oven cavity can result in the loss of a fair amount of heat. When the cooking operation has to be resumed, an additional amount of energy is needed to simply get the cavity back to the pre-opened temperature. Therefore, the opening of the cavity represents a cost to the consumer and an undesirable energy loss.

To a certain extent, this problem has been addressed in the art of cooking appliances by providing a window area in the door used to access the oven cavity of the cooking appliance. With such an arrangement, the food products being cooked can be viewed through the window without having to open the door. This feature has been generally coupled with the inclusion of a light within the oven cavity to enhance the viewing of the food. Typically, a manual switch is provided to enable the light to be selectively utilized when needed.

In various types of known appliances, it is common to time an oven cooking operation, either directly by a timer provided on the appliance or through another source. Even when the oven has an associated window and light arrangement, an oven door will, almost invariably, still be opened when the cooking timer expires. However, cooking times inherently vary with the particular food product being cooked. Therefore, although the established cooking time may have elapsed, additional cooking may still be needed.

Based on the above, it would be beneficial to use the window and light to view the food item(s) being cooked to assure additional cooking time is not needed prior to opening the door, even though the established cooking time may have expired. Unfortunately, based on instinct, habit or otherwise, the cavity door is generally opened after the established cooking time has been reached. In order to avoid the unnecessary opening of the oven door, it would be desirable to provide a system which would draw the attention of a consumer to the viewing of the food product(s) prior to opening the oven door in order to verify that the cooking operation is, in fact, completed. In addition, it would be beneficial to provide a control system which would function to automatically turn off the oven light following activation thereof, either through a conventional manual switch or the automatic activation system of the present invention, after the oven door is opened and closed.

SUMMARY OF THE INVENTION

The present invention is concerned with controlling the activation of a light within a cooking cavity of a cooking appliance. In accordance with one aspect of the invention, a control system is designed to direct the attention of a cooking appliance user to view the food being cooked in an enclosed cavity prior to the opening of an oven door. More specifically, the cooking appliance is provided with a light within its cooking cavity and a control system for activating the light automatically prior to the expiration of a pre-established time period for a given cooking operation.

In the most preferred form of the invention, the light will be activated at some predetermined interval prior to the end of a timed cooking operation and will remain illuminated until at least one pre-established condition is met. For instance, the light can be de-activated by manually manipulating an available light or cancel switch, upon opening and closing of the oven door after the cooking time period expires, or after the cooking time period expires and provided audible reminder signals have been exhausted.

Preferably, the presence of the light will minimize unnecessary cavity door openings. If the user views the food and decides that further cooking time is warranted, then the process of adding the additional cook time will function to reactivate the automatic light feature of the invention. In addition, if the user opens the door following activation of the cavity light but prior to the expiration of the established cooking time period, then the light will remain on until after the cooking function is completed.

Additional objects, features and advantages of the present invention will become more readily apparent from the following detailed description of a preferred embodiment, when taken in conjunction with the drawings wherein like reference numerals refer to corresponding parts in the several views.

DETAILED DESCRIPTION OF A PREFERRED EMBODIMENT

Figure 1:
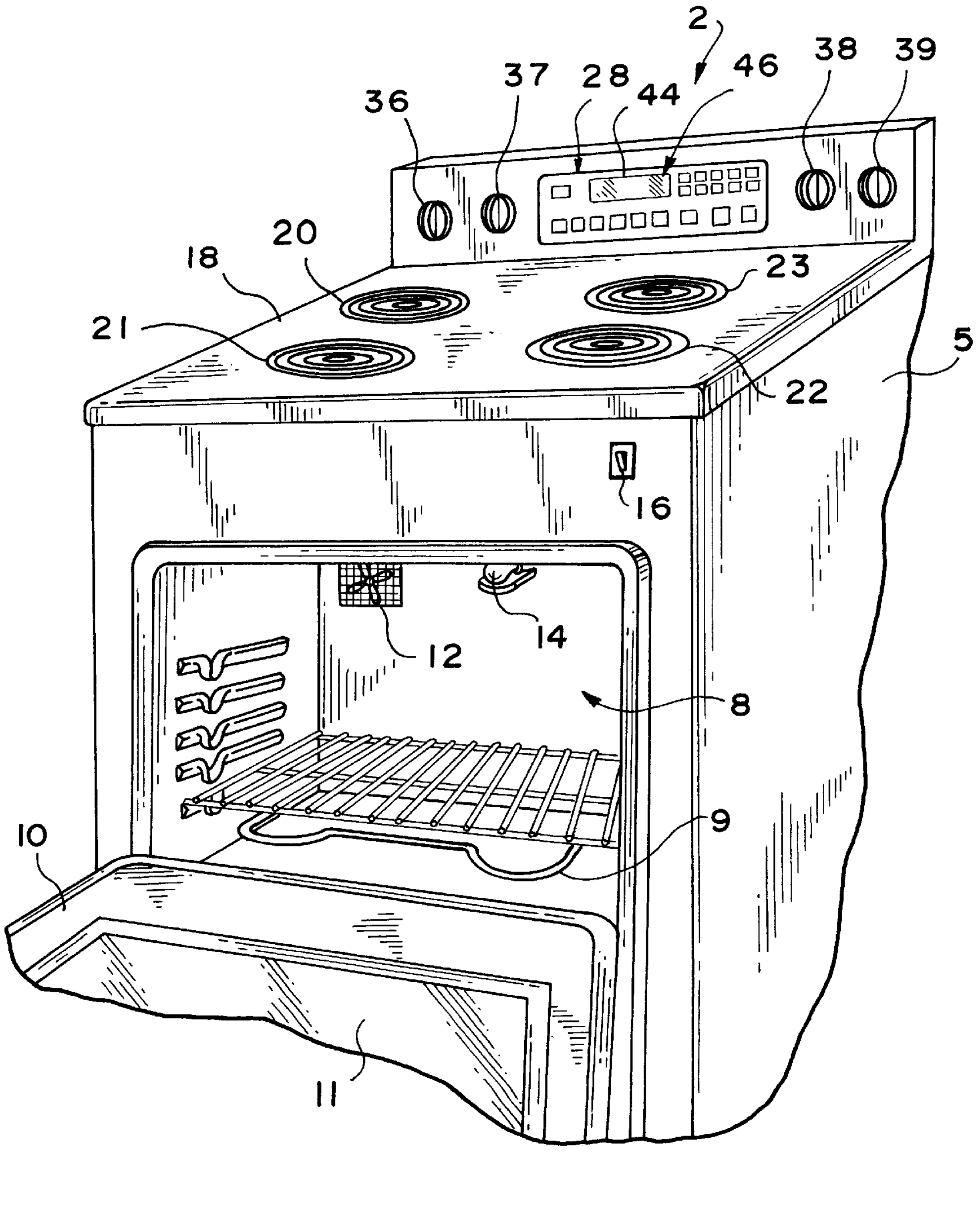
FIG. 1 is a partial perspective view of an electric range incorporating an automatic lighting system according to a preferred embodiment of the invention.

With initial reference to FIG. 1, the invention is illustrated for use in connection with an electric range generally indicated at 2. In the embodiment shown, electric range 2 includes a cabinet 5 within which is arranged an oven cavity 8 having an associated lower electric heating element 9 and a door 10 shown in an open condition wherein access to oven cavity 8 is permitted. Although not shown, an upper electric heating element would also be provided in oven cavity 8, such as for broiling operations as widely known in the art. This figure also illustrates the presence of a viewing window 11 in door 10. Furthermore, within oven cavity 8, a fan 12 and a light 14 are provided. In a manner known in the art, cabinet 5 is provided with a light switch 16 which functions to turn on light 14 upon the opening of door 10.

Cabinet 5 is also provided with an associated range top 18 which supports various spaced surface heating elements 20–23 in a manner known in the art. At an upper rear portion, cabinet 5 is provided with a control panel 28. Control panel 28 includes a plurality of knobs 36–39 for use in selectively activating and deactivating surface heating elements 20–23 respectively. In addition, control panel 28 is shown to include a central display 44, such as an LED or LCD display unit (also see FIG. 2). Furthermore, control panel 28 is provided with a number pad generally indicated at 46 having buttons for the numbers zero (0) through nine (9), with the zero (0) button also functioning as a reset control button.

Although the particular features incorporated into electric range 2 could vary greatly within the scope of the present invention, for the sake of completeness in describing a preferred form of the invention, control panel 28 of range 2 is also shown to include a lower row of control buttons generally indicated at 48 which are provided to select various operational modes for oven 8. For instance, the row of control buttons 48 can be used to select bake, broil and clean modes for oven 8 through respective buttons 49–51. In the particular embodiment shown, an additional convection baking mode, which is essentially defined by a baking mode with the further activation of fan 12, can also be selected through button 53. In the most preferred form of the invention, it is desirable to enable the user to program the operation of oven 8 through the use of the lower row of control buttons 48, control button 53 and numeric pad 46, as well as timer buttons 62 and 63. Furthermore, buttons 66 and 67 are provided to enable a consumer to set desired count-down and clock times, in combination with numeric pad 46, respectively. Finally, button 68 performs a stop or clear control function, while button 69 enables a consumer to turn on light 14 without opening door 10 such that oven cavity 8 can be selectively viewed through window 11. Of course, although various buttons are described for use on control panel 28, other types of control switches could equally be employed.

Control panel 28 has an associated CPU 75 for controlling fan 12 and the heat sources of range 2, i.e., heating elements 9 and 20–23. The control of fan 12 and heating elements 9 and 20–23 is performed in a manner known in the art, does not constitute part of the present invention and therefore will not be discussed further here. Instead, the present invention is particularly directed to the manner in which CPU 75 is programmed to indicate to a user of range 2 that a cooking operation is nearing its completion time. More particularly, CPU 75 operates in accordance with the present invention to actuate light 14 in order to illuminate oven cavity 8 prior to the expiration of a timed cooking operation in order to bring the attention of the user to view the progress of the cooking operation within oven 8 as will be discussed in detail below.

Figure 2:
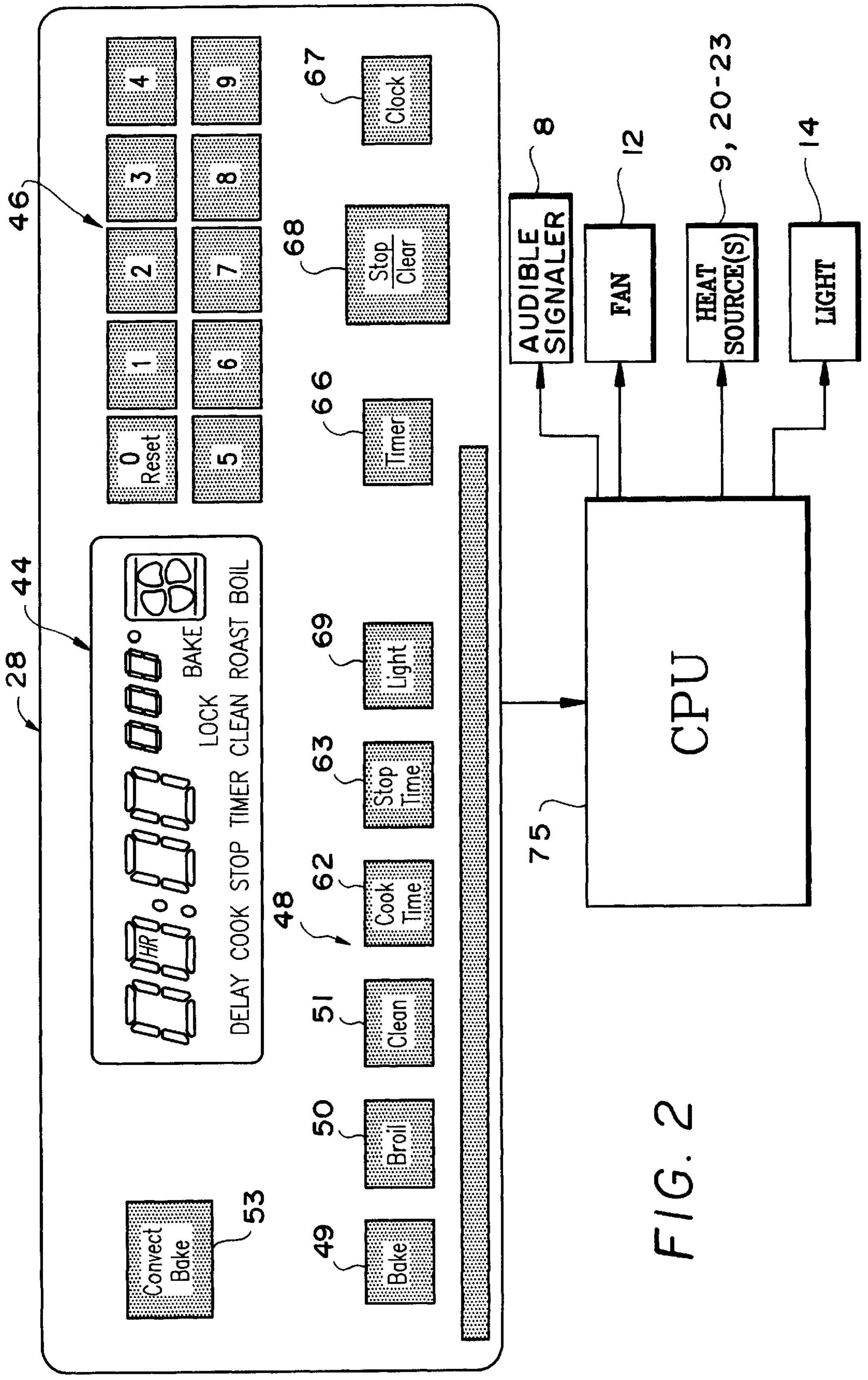
FIG. 2 schematically illustrates a control arrangement that forms part of the automatic lighting system provided in the range of FIG. 1.

In using range 2, a consumer can select a desired cooking function or operational mode through control buttons 49, 50 and 53, while also establishing an operating time period for the respective heat source utilizing numeric pad 46 and timer buttons 62 and 63. In a preferred embodiment, the selected operation will be shown by illuminating key words or symbols on central display 44. At the end of a cooking operation, it is preferable to provide some type of audible or visual indicator to the consumer that the established time period has expired. This is typically done by incorporating a piezoelectric buzzer or the like as indicated in FIG. 2 at 80. If, at the end of a cooking operation, the consumer was to open door 10 in order to visually inspect the food being cooked and then was to determine that an additional cooking time is needed, a substantial amount of heat from within oven cavity 8 would be lost. In many instances, turning on light 14 and viewing the food being cooked through window 11 of door 10 would provide the consumer with an enough information to determine if further cooking time is warranted. In a conventional cooking appliance, light button 69 would need to be used to turn on light 14.

In practice, it is rare that the user of a cooking appliance, such as range 2, would view the food through window 11 after receiving the audible or visual signal that the established cook time period has expired. To minimize the possible inefficiencies associated with the premature opening of door 10, CPU 75 functions in accordance with the present invention to automatically activate light 14 prior to expiration of the operating time period established for the cooking operation. More specifically, CPU 75 functions to activate light 14 a predetermined time, such as one minute, prior to the expiration of the established cooking operation. This illumination of oven cavity 8 is intended to bring the attention of the user to viewing the progress of the cooking operation without necessarily opening oven cavity door 10. Therefore, the automatic light activating arrangement of the present invention will bring the attention of the user to the fact that the established cooking operation is nearing completion and can be used in conjunction with or in place of a conventional visual and/or audible signaling arrangement.

If, after viewing the food being cooked, it is determined that further cooking time is warranted, than the process of adding additional cooking time will function to re-set the automatic light activating feature of the invention. If viewing oven cavity 8 indicates that the food is completely cooked, the light 14 will remain on when door 10 is open to retrieve the food and CPU 75 is programmed to turn off light 14 when door 10 is again closed. Actually, CPU 75 is also programmed to automatically turn off light 14 when light button 69 is engaged to activate light 14 and then door 10 is opened and closed. In the most preferred form of the invention, oven light 14 is designed to automatically illuminate at some predetermined time prior to the end of a timed cooking operation and to stay illuminated unless the cooking time has expired and the door is open and closed again; the cook time has expired and any audible and/or visual reminder signals have been exhausted; the stop/clear button 68 is pressed; or the light button 69 is pressed. If the user opens door 10 to view the food after light 14 has automatically been activated before the expiration of the established cooking time period, then light 14 will preferably remain on until after the cooking operation is terminated. At that time, light 14 will automatically turn off.

Although described with respect to a preferred embodiment of the invention, it should be understood that various changes and/or modifications can be made to the invention without departing from the spirit thereof. For instance, although the automatic lighting system of the invention has been described for use in electric range 2, it should be understood that the invention can be used in various types of cooking appliances, including microwave ovens. Certainly, it is possible to provide other types of signaling arrangements along the lines described above, which would indicate to the user of a cooking appliance that the operating time period for an established cooking operation is nearing completion and that the cooking progress should be reviewed prior to opening of door 10, without departing from the invention. In any event, the invention is only intended to be limited by the scope of the following claims.

We claim:

1. A cooking appliance comprising:

a oven cavity having an open frontal portion to enable access to within the oven cavity;

a door pivotally mounted for movement between a closed position, wherein the door extends across the open frontal portion of the oven cavity, and an open position, wherein access to within the oven cavity is permitted, said door including a window portion for viewing the oven cavity without opening the door;

a unit for beating food products placed within the oven cavity, said heating unit being adapted to be activated for an operating time period during a cooking operation;

a lighting source adapted to illuminate the oven cavity when activated;

a control unit, linked to said lighting source, for automatically activating the lighting source during the cooking operation based on the operating time period of the heating unit; and means for producing signals when the operating time period has expired, said control unit functioning to shut off the lighting source following termination of the signals.

2. The cooking appliance according to claim 1, wherein the control unit automatically activates the lighting source prior to expiration of the operating time period.

3. The cooking appliance according to claim 2, further comprising: an operator control panel, connected to the control unit, for pre-setting the operating time period.

4. The cooking appliance according to claim 3, wherein the operator control panel includes a switch for selectively de-activating the lighting source following an automatic activation of the lighting source.

5. The cooking appliance according to claim 2, further comprising: a switch electrically connected to the control unit, said switch being interposed between the oven cavity and the door such that opening and closing of the door repositions the switch between first and second positions, wherein the control unit de-activates the lighting source following expiration of both the operating time period and the shifting of the switch between the first and second portions.

6. The cooking appliance according to claim 3, wherein the cooking appliance constitutes an electric range.

7. The cooking appliance according to claim 1, further comprising:

an operator control panel including a first light switch for manually activating the lighting source; and a second light switch connected to the control unit, with opening and closing of the door repositioning the second light switch between first and second positions wherein, when the lighting source is activated through the first light switch, the control unit automatically deactivates the lighting source upon the opening and closing of the door as sensed by the second light switch.

8. A cooking appliance comprising:

a oven cavity having an open frontal portion to enable access to within the oven cavity;

a door pivotally mounted for movement between a closed position, wherein the door extends across the open frontal portion of the oven cavity, and an open position, wherein access to within the oven cavity is permitted, said door including a window portion for viewing the oven cavity without opening the door;

a unit for heating food products placed within the oven cavity, said heating unit being adapted to be activated for an operating time period during a cooking operation;

a lighting source for illuminating the oven cavity when activated;

means for automatically indicating to a user of the cooking appliance that the operating time period of the cooking operation is nearing completion by activating the lighting source, wherein the indicating means comprises a control unit for automatically illuminating the lighting source during the cooking operation based on the operating time period of the heating unit; and a switch electrically connected to the control unit said switch being interposed between the oven cavity and the door such that opening and closing of the door repositions the switch between first and second positions, wherein the control unit de-activates the lighting source following expiration of both the operating time period and the shifting of the switch between the first and second positions.

9. The cooking appliance according to claim 8, wherein the control unit automatically illuminates the lighting source prior to expiration of the operating time period.

10. The cooking appliance according to claim 9, further comprising: an operator control panel, connected to the control unit, for pre-setting the operating time period.

11. The cooking appliance according to claim 10, wherein the operator control panel includes a switch for selectively de-activating the lighting source following an automatic activation of the lighting source.

12. The cooking appliance according to claim 9, further comprising: a switch electrically connected to the control unit, said switch being interposed between the oven cavity and the door such that opening and closing of the door repositions the switch between first and second positions, wherein the control unit de-activates the lighting source following expiration of both the operating time period and the shifting of the switch between the first and second portions.

13. The cooking appliance according to claim 9, further comprising: means for producing signals when the operating time period has expired, said control unit functioning to shut off the lighting source following termination of the signals.

14. The cooking appliance according to claim 10, wherein the cooking appliance constitutes an electric range.

15. A cooking appliance comprising:

a oven cavity having an open frontal portion to enable access to within the oven cavity;

a door pivotally mounted for movement between a closed position, wherein the door extends across the open frontal portion of the oven cavity, and an open position, wherein access to within the oven cavity is permitted, said door including a window portion for viewing the oven cavity without opening the door;

a unit for heating food products placed within the oven cavity, said heating unit being adapted to be activated for an operating time period during a cooking operation;

a lighting source for illuminating the oven cavity when activated;

a switch for selectively, manually controlling an illumination status of the lighting source; and means for automatically altering the illumination state of the lighting source in dependence upon both an opening and closing of the door following an activation of the lighting source through the switch and the operating time period of the heating unit.

16. The cooking appliance according to claim 15, wherein the indicating means comprises a control unit for automatically illuminating the lighting source during the cooking operation based on the operating time period of the heating unit.

17. The cooking appliance according to claim 16, further comprising: an operator control panel, connected to the control unit, for pre-setting the operating time period.

18. A cooking appliance comprising:

a oven cavity having an open frontal portion to enable access to within the oven cavity;

a door pivotally mounted for movement between a closed position, wherein the door extends across the open frontal portion of the oven cavity, and an open position, wherein access to within the oven cavity is permitted, said door including a window portion for viewing the oven cavity without opening the door;

a unit for heating food products placed within the oven cavity, said heating unit being adapted to be activated for an operating time period during a cooking operation;

a lighting source for illuminating the oven cavity when activated;

a switch for selectively, manually controlling an illumination status of the lighting source;

means for automatically altering the illumination state of the lighting source in dependence upon at least one of an opening and closing of the door following an activation of the lighting, source through the switch and the operating time period of the heating unit, wherein the indicating means comprises a control unit for automatically illuminating the lighting source during the cooking operation based on the operating time period of the heating unit; and means for producing signals when the operating time period has expired, said control unit functioning to shut off the lighting source following termination of the signals.

19. A method of operating a cooking appliance having an oven cavity, defined at least in part by a openable door and within which food items are adapted to be cooked, and a control panel for inputting desired cooking information comprising:

selecting a desired cooking operation and operating time period through the control panel;

activating a unit for heating the oven cavity for the operating time period;

automatically altering an illumination status of a lighting source for the oven cavity based on at least one of the selected operating time period and an opening and closing the door following activation of the lighting source;

selectively, manually activating the lighting source; and automatically de-activating the lighting source following opening and closing of the door.

20. The method according to claim 19, further comprising: de-activating the lighting source following both the expiration of the operating time period and the opening and closing of the door.

21. The method according to claim 19, further comprising: performing the step of automatically illuminating the oven cavity prior to expiration of the operating time period.

22. The method according to claim 21 further comprising:

signaling when the operating time period has elapsed; and de-activating the lighting source when the operating time period has elapsed and the signaling is completed.

23. The method according to claim 21, further comprising:

establishing a supplemental operating time period for the heating unit following activation of the lighting source; and re-establishing an automatic illumination time for the lighting source based on the supplemental operating time period.

* * * * *